United States Patent [19]
Bock et al.

[11] Patent Number: 5,362,827
[45] Date of Patent: Nov. 8, 1994

[54] SOLUTION PROCESS FOR PREPARATION HYDROPHOBICALLY FUNCTIONALIZED CATIONIC POLYMERS (C-2691)

[75] Inventors: Jan Bock, Bridgewater; Paul L. Valint, Asbury, both of N.J.; Thomas J. Pacansky, Houston; Henry W. H. Yang, Kingwood, both of Tex.

[73] Assignee: Exxon Research & Engineering Co., Florham Park, N.J.

[21] Appl. No.: 919,805

[22] Filed: Jul. 27, 1992

Related U.S. Application Data

[63] Continuation of Ser. No. 314,674, Feb. 22, 1989, abandoned, which is a continuation of Ser. No. 53,970, May 26, 1987, abandoned, which is a continuation of Ser. No. 904,908, Sep. 8, 1986, abandoned.

[51] Int. Cl.$^5$ .............................. C08F 4/04; C08F 2/10
[52] U.S. Cl. .............................. 526/219.2; 526/229; 526/230; 526/287; 526/307.1; 526/307.2; 526/307.3
[58] Field of Search .................. 526/287, 307.1, 307.2, 526/307.3, 307.4, 307.7, 209, 222, 217, 225, 219.2

[56] References Cited

U.S. PATENT DOCUMENTS

| | | | |
|---|---|---|---|
| 4,154,910 | 5/1979 | Tanaka et al. | 526/307.2 |
| 4,395,524 | 7/1983 | Emmons et al. | 526/307.2 |
| 4,514,551 | 4/1985 | Iwwono et al. | 526/307.2 |
| 4,520,182 | 5/1985 | Twiner et al. | 526/307.2 |
| 4,521,580 | 6/1985 | Twiner et al. | 526/307.2 |
| 4,650,848 | 3/1987 | Schulz et al. | 526/307.2 |
| 4,673,716 | 6/1987 | Siano et al. | 526/307.2 |
| 4,694,046 | 9/1987 | Bock et al. | 526/307.2 |
| 4,742,135 | 5/1988 | Schulz et al. | 526/307.2 |
| 4,835,234 | 5/1989 | Nalint et al. | 526/258 |

Primary Examiner—Thurman K. Page
Assistant Examiner—Peter F. Kulkoski
Attorney, Agent, or Firm—Richard E. Nanfeldt; Joseph J. Dvorak

[57] ABSTRACT

This invention provides a process for preparing novel hydrophobically associating polymers containing cationic functionality which are useful for clean-up of waste waters containing organic contaminants. These water soluble polymers contain both water soluble and water insoluble monomers. The water soluble monomers are acrylamide (AM) and a salt of an unsaturated amine base (C), and the water insoluble monomer is a higher alkyl(meth)acrylamide or alkyl(meth)acrylate (R). These polymers are referred to as CRAM. The process relies on the dissolution of the water insoluble monomer(s) into an aqueous solution of water soluble monomers by means of a water miscible mutual cosolvent. The type and concentration of miscible solvents are chosen to produce a clear, uniform, homogeneous aqueous solution of the hydrophobic monomers in the presence of both nonionic and cationic water soluble monomers and, in addition, the reaction medium remains a clear, uniform, homogeneous mixture with no phase separation as the reaction proceeds to completion. Redox or free radical initiators are used to copolymerize both the water soluble and water insoluble monomers, forming terpolymers of ethylenically unsaturated amine base salts, alkyl(meth)acrylamides of alkyl(meth)acrylates and acrylamide. These polymers provide exceptional clean-up of waste waters containing organic contaminants. Also they are very effective for resolving oil-in-water emulsion, as such as those found in oil production.

11 Claims, No Drawings

SOLUTION PROCESS FOR PREPARATION HYDROPHOBICALLY FUNCTIONALIZED CATIONIC POLYMERS (C-2691)

CROSS-REFERENCE TO RELATED APPLICATIONS

This is a Rule 60 continuation of U.S. Ser. No. 314,674, filed Feb. 22, 1989, now abandoned which is a Rule 60 continuation of U.S. Ser. No 053,970, filed May 26, 1987, now abandoned which is a Rule 60 continuation of U.S. Ser. No. 904,908, filed Sep. 8, 1986, now abandoned.

BACKGROUND OF THE INVENTION

1. Field of the Invention

This invention provides a process for preparing novel hydrophobically associating polymers containing cationic functionality. These water dispersible polymers contain both water soluble and water insoluble monomers. The water soluble monomers are acrylamide (AM) and a salt of an unsaturated amine base (C) and the water insoluble monomer is a higher alkyl(meth)acrylamide or alkyl(meth)acrylate (R). These polymers will hereafter be referred to as CRAM. The process for their preparation relies on solubilizing the water insoluble monomer into an aqueous solution by means of a water miscible cosolvent. Dissolution of the hydrophobic monomer(s) can be carried our in the presence of neutral and/or cationic monomers, such as acrylamide, 3-methacrylamidopropyltriethylammonium chloride (MAPTAC), 2-methacrylatoethyltrimethylammonium chloride (METAC) or diallyl dimethylammonium chloride (DMDAAC). Redox, azo, peroxide, or other free radical initiators are used to copolymerize both the water soluble and hydrophobic monomers, forming terpolymers of ethylenically unsaturated amine base salts, alkyl(meth)acrylamides or alkyl(meth)acrylates and acrylamide. These polymers provide exceptional clean-up of waste waters containing organic contaminants. Also they are very effective for resolving oil-in-water emulsions, such as those found in oil production.

DESCRIPTION OF THE PRIOR ART

The production of waste water clean enough for safe disposal continues to be a problem, especially when oil is emulsified in the primary waste water. In oil production, especially where high levels of water flooding or steam flooding are being practiced, oil-in-water emulsions are generated. Other oil-in-water emulsions of concern in the waste water treating area are those produced as a result of steel mill and metal working operations, food processing, refinery and chemical plant operation, cooling water blow-down, bitumen extraction from tar sands and shale oil operations, rain water run-off and a host of others. These emulsions all have in common the fact that the oil or organic phase is insoluble in the water continuous phase. The amount of oil dispersed in these water continuous emulsions varies from a few to several hundred parts per million, in waste waters, to several percent (5 to 25% or more) in fluids right out of the wellhead.

The oil is generally well dispersed in the water phase as very small droplets that are stabilized as a result of the presence of natural surfactants. The stability of these oil-in-water emulsions generally results from either a negative charge imparted to the droplets by these surfactants, or from steric stabilization caused by surfactants, or by shear which the fluid experiences during production, which causes the generation of smaller and more stable droplets, or from several other sources.

Various chemicals, surfactants and polymers are generally applied to these waters to enhance the separation of oil and water. These chemicals are used to aid in foam generation in flotation. In addition they may be used to cause oil droplet surface charge neutralization, which results in destabilization of the oil-in-water emulsion. This destabilization results in agglomeration of the oil droplets, floc formation and, possibly, several other beneficial effects. While the use of such chemicals generally enhances the separation of oil from oil-in-water emulsions, there remains significant room for improvement. The type of water soluble polymers currently used are generally acrylamide copolymers or melamine/formaldehyde polymers or others. For example, Bolhofner, in U.S. Pat. No. 4,472,284, describes the treatment of water containing fats, oils and greases using a melamine-formaldehyde condensation product, alone or in combination with a polyacrylamide. Rather high polymer concentrations are needed and a two polymer system can present handling difficulties during field operations.

Another approach to the treatment of waste water involves the use of water insoluble polymeric adsorbents, as described by Renner in U.S. Pat. No. 3,716,483, or Takegani, et al. in U.S. Pat. No. 4,081,403. These processes for treating waste water are costly and cannot achieve the degree of clean-up of the polymers produced by the process of the present invention.

Another approach involves the use of copolymers of acrylamide with various cationic monomers of various comonomer ratios. Some of the cationic monomers that have been used are: methacrylamidoalkyltrimethylammonium salts, such as methacrylamidopropyltrimethylammonium chloride (MAPTAC), as described in U.S. Pat. No. 4,160,742, or similar acrylate esters; diallyl dialkyl ammonium salts, as described by Booth and Linke in U.S. Pat. Nos. 3,147,218 and 3,316,181; salts of dimethylaminoethylmethacrylate and the like. Buris, et al., U.S. Pat. No. 4,224,150, describe a process for clarifying aqueous systems employing quaternary ammonium adducts of polymerizable tertiary ammonium salts and acrylamide. These polymers are generally available as high molecular weight materials, either in aqueous solution, as emulsions of various types, or in solid form, which requires dissolution before use.

The use of hydrophobic groups on water soluble polymers to enhance the rheological properties of water based fluids has been described. One approach to provide polyacrylamide based systems containing hydrophobic groups is described by Bock, et al., U.S. Pat. No. 4,520,182. Water soluble acrylamide copolymers containing a small amount of oil soluble or hydrophobic alkyl acrylamide groups were found to impart efficient viscosification to aqueous fluids. Landoll, U.S. Pat. No. U.S. Pat. No. 4,304,902, describes copolymers of ethylene oxide with long chain epoxides which also required relatively large polymer concentrations (approximately 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification by a water soluble polymer containing hydrophobic groups is described by Evani, U.S. Pat. No. 4,432,881. The need for a surfactant to achieve solubility and thickening efficiency should make such a system very salt sensitive, as well as very sensitive to small changes in surfactant and polymer concentration. Emmons, et al., U.S. Pat. No. 4,395,524, teaches acrylamide copolymers as thickeners for aqueous systems. While these polymers possess hydrophobic groups, they do not contain the cationic monomers disclosed in this invention and are not effective in treating oil-in-water emulsions or viscosifying water-based fluids.

One of the objects of this invention is to overcome the deficiencies in the use of the water soluble polymers of the prior art for treating oily waste water and resolving oil-in-water emulsions. A new class of water soluble polymer, described in copending application Ser. No. 800,743, filed Nov. 28, 1985, now abandoned, can be used at a lower treat rate and hence is more efficient than prior art materials for oily water treatment. Furthermore, these novel terpolymers provide a superior degree of clean-up or oil removal in comparison to the prior art materials. These new polymers contain a nonionic water soluble monomer, such as acrylamide, a cationically charged, water soluble, ethylenically unsaturated amine-based monomer, such as 3-methacrylamidopropyltrimethylammonium chloride (MAPTAC), and a water insoluble or hydrophobic monomer, such as an alkyl(meth)acrylamide or alkyl (meth) acrylate with a chain length of 4 carbons or greater.

When these polymers are placed in an aqueous solvent, the hydrophobic groups aggregate or associate in a manner similar to a surfactant. This hydrophobic association between polymer chains in solution results in an increase in the hydrodynamic size of the molecule, which, in turn, causes an increase in viscosity. In addition, if oil droplets are present there is an attractive interaction between the hydrophobic groups and the hydrophobic oil droplets. We have found that the presence of cationic groups, such as 3-methacrylamidopropyltrimethylammonium chloride (MAPTAC) causes an expansion of the polymer in solution, an improvement in polymer solubility and a favorable interaction with the hydrophobic groups. Thus, polymers containing both cationic amine-based groups and hydrophobic groups provide a significant improvement in viscosification efficiency of water based systems. The synergism between the cationic and hydrophobic groups in terms of oily water treatment or breaking or oil-in-water emulsions also sets these polymers apart from those of the prior art.

Synthesis of polymers containing both hydrophobic and cationic functionality presents difficulties. In order for polymerization to be effected, the monomers must obviously come into close proximity to one another. The incompatibility of the oil soluble and water soluble monomers in water as the solvent prevents an effective concentration of one or other of these monomeric species from being achieved at the locus of polymerization of the other comonomer. Several processes described in the prior art could conceivably achieve this, but have serious deficiencies, necessitating this invention. For example, simply dispersing the water insoluble monomer as fine particles in the aqueous medium containing dissolved water soluble monomers would result in low incorporation of the water insoluble monomer and would lead to a heterogeneous product of particles dispersed in a predominantly water soluble polymer. The resulting polymer could not be used to impart efficient and uniform thickening to water based fluids, nor be very effective in treating oily water.

Techniques for polymerizing water soluble polymers, such as those taught in U.S. Pat. No. 4,154,190, 3,211,708, 3,002,960 and 3,284,393, cannot be used to prepare the compositions of this invention. Also, techniques or processes for preparing cationic polymers or copolymers containing cationic monomers, such as U.S. Pat. Nos. 4,452,957, 4,283,517, 4,160,742 and 3,316,181, have deficiencies in terms of incorporating the hydrophobic monomers needed for the polymers of this invention. This art does not teach the formation of a sufficiently fine dispersion of the water and oil soluble monomers to enable uniform reaction and homogeneous terpolymers to be produced. The use of mutual solvents or solvent mixtures to dissolve the water and oil soluble monomers, as taught by Lenke, et al., U.S. Pat. No. 4,151,333, and Barua, et al., U.S. Pat. No. 4,098,987, has some serious limitations. Although this approach undoubtedly allows the incompatible monomers to come into close proximity to one another, since the dispersion is on a molecular scale often the resulting copolymer is insoluble in the same solvent, as shown in U.S. Pat. No. 4,151,333. This leads to precipitation of the copolymer before it has achieved sufficient molecular weight to provide efficient aqueous viscosification or effective oily water treatment. The nonionic polymeric surfactants taught in U.S. Pat. No. 4,098,987 possess extremely low molecular weight (less than 10,000 amu) and lack the cationic functionality necessary for the present polymers. Thus, these teachings provide polymers which are rather ineffective viscosifiers for aqueous fluids and do not provide the extent or efficiency of oily water clean-up or breaking of oil-in-water emulsions. A major objective of this invention is to teach a process for preparing water dispersible or water soluble polymers containing both hydrophobic and cationic functionality. A further objective is to provide a process for producing these polymers for treatment of oily water.

Two techniques have been found most useful for preparing hydrophobically associating copolymers of acrylamide and alkylacrylamides. The first method was based on the use of a water continuous microemulsion to disperse the oil soluble monomer in a solution of the water soluble monomers. Details of the procedures and techniques are taught by Turner, et al., U.S. Pat. No. 4,521,580. A second method for preparing copolymers of acrylamide and alkylacrylamide was based on dispersing the oil soluble monomer using an aqueous micellar solution of the water soluble monomers. Suitable surfactants and the details of the polymerization are taught by Turner, et al., U.S. Pat. No. 4,528,348. While either the microemulsion or micellar polymerization techniques can be used to prepare hydrophobically associating polymers containing a variety of water soluble nonionic monomers, a problem arises when the monomers have a strong interaction with the surfactants used in the polymerization. In particular, strong ionic interactions or complexes can be formed between cationic water soluble monomers, such as ethylenically unsaturated amine based monomers, and anionic surfactants, such as alkyl sulfates and sulfonates.

A process is described in this application which overcomes these interactions to allow for the preparation of novel hydrophobically associating cationic polymers. The present invention teaches the use of mutual solvents with water to provide effective copolymerization of water soluble and water insoluble monomers. The use of water miscible solvents provides dissolution on a molecular scale of hydrophobic monomers in the aqueous medium containing water soluble monomers. This allows the incompatible monomers to come into close proximity, resulting in the formation of novel hydrophobically associating cationic polymers. In addition, the concentration of the monomers and, thus, final polymer is high enough to provide a significant economic benefit and sufficient polymer molecular weight needed in many applications. A copending application, U.S. Pat. No. 4,741,835, describes a micellar polymerization technique for forming hydrophobically associating cationic polymers of high molecular weight. The composition of the polymers are more fully described in copending application Ser. No. 800,743, filed Nov. 28, 1985, now abandoned.

SUMMARY OF THE INVENTION

A process is described for producing unique and novel cation containing polymers of water soluble monomers with water insoluble monomers which are useful for clean-up of waste waters containing organic contaminants. The process relies on the dissolution of the water insoluble monomer(s) into an aqueous solution of water soluble monomers by means of a water miscible mutual cosolvent. The type and concentration of miscible solvents are chosen to produce a clear, uniform, homogeneous aqueous solution of the hydrophobic monomers in the presence of both nonionic and cationic water soluble monomers. In addition, the reaction medium remains a clear, uniform, homogeneous mixture with no phase separation at low conversion. As the reaction proceeds toward completion some turbidity may occur, however, the solutions are stable toward phase separation. The water insoluble monomer remains dispersed on a very fine scale so that the polymerization is effected without the formation of particulates of water insoluble polymer.

DETAILED DESCRIPTION OF THE INVENTION

The solution free radical polymerization process of this invention comprises the steps of forming a uniform solution of an oil soluble or hydrophobic monomer, a nonionic water soluble monomer, such as acrylamide, and a cationic monomer, such as MAPTAC, using a minor amount of a water miscible solvent, such as acetone, methanol or isopropanol, and a major amount of water; deaerating this solution by purging with nitrogen or, additionally, applying a vacuum; raising the temperature to the desired reaction temperature; adding sufficient free radical initiator to the reaction solution; and polymerizing for a sufficient period of time at a sufficient temperature to effect polymerization. The resulting polymer of acrylamide, cationic monomer and a hydrophobic monomer can be isolated from the reaction mixture by any of a variety of techniques which are well known to one skilled in the art. For example, the polymer may be recovered by precipitation using a nonsolvent, such as acetone, methanol, isopropanol or mixtures thereof. The precipitated polymer can then be washed and oven dried to provide a product in the form of a free flowing powder. Alternatively, the polymer solution may be used as is by diluting with the desired aqueous solvent to the concentration of use.

The present invention describes the polymerization of a nonionic, water soluble, ethylenically unsaturated monomer, such as acrylamide; a water soluble, cationic monomer from the group consisting of ammoniumalkyl(meth)acrylamides, ammoniumalkyl(meth)acrylates and diallyl dialkyl ammonium salts; and a water insoluble monomer, such as an N-alkyl(meth)acrylamide or alkyl(meth)acrylate. The process for synthesizing these polymers relies on solubilizing the water insoluble monomer into a predominantly aqueous media by the use of mutual solvents, comprising a mixture of a suitable water miscible solvent, such as a short chain alcohol or acetone and water. When mixed with the water soluble acrylamide monomer and the water soluble cationic monomer the solution remains clear and homogeneous. The water insoluble monomer is dispersed on an extremely fine scale so that the reaction mixture is isotropic, clear and homogeneous. The polymerization can, therefore, be initiated by water soluble initiators to yield polymers which are substantially free of visible particulates. The resultant reaction mixture remains homogeneous throughout the course of the reaction without the need for agitation with external mixers or stirrers.

The polymerization reaction is conducted in a suitable solvent mixture consisting of a minor amount of a water miscible solvent and a major amount of water. The water miscible solvent is an oxygenated solvent containing 1 to 4 carbon atoms, such as methanol, ethanol, isopropanol and isobutanol or acetone. The preferred alcohol solvent is isopropanol. The concentration of cosolvent alcohol or acetone in the mutual solvent mixture with water is about 2 to 40 volume percent, more preferably 2 to 30 volume percent, and most preferably 5 to 25 volume percent.

Polymerization of the water soluble and water insoluble monomers is conducted in solution using a suitable free radical initiator. Examples of suitable water soluble free radical initiators include peroxides, such as hydrogen peroxide; persulfates, such as sodium, potassium or ammonium persulfate, and water soluble azo initiators. The concentration of the free radical initiator is about 0.01 to about 0.5 grams per hundred grams of total monomers. Suitable oil soluble initiators are organic peroxides and azo compounds, such as azobisisobutyronitrile. Water soluble initiators are preferred, such as potassium persulfate or azo initiators. Redox initiation involving an oxidant, such as potassium persulfate or potassium bromate, and a reductant, such as sodium metabisulfite, or tertiary amines, such as triethyl amine, can also be used to initiate polymerization, particularly at low temperatures. Polymerizing at lower temperature results in the formation of higher molecular weight polymers which are desirable from the standpoint of efficient aqueous viscosification. Typically, it is desired to employ from about 0.01 to about 0.5 weight percent of initiator based on the weight of monomers. The polymerization temperature is preferably about 0° C. to about 90° C., more preferably about 20° C. to about 80° C., and most preferably about 25° C. to about 70° C.

The water soluble hydrophobically associating polymers which can be prepared by the process of the instant invention are characterized by the formula:

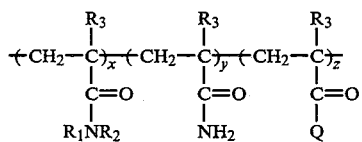

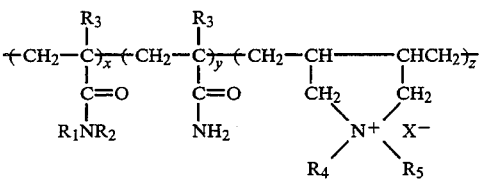

wherein $R_1$ is preferably a $C_4$ to $C_{30}$ linear or branched alkyl, alkylcycloalkyl or alkylaryl group, more preferable $C_6$ to $C_{22}$, and most preferably $C_6$ to $C_{18}$; and $R_2$ is the same or different group as $R_1$, or hydrogen or $C_1$ to $C_3$ linear or branched alkyl group; and $R_3$ is hydrogen or methyl; and Q is a salt of an ammonium cation, such as $NH(CH_2)_n N^+(R_{4,5,6})_3 X^-$ or $O(CH_2)_n N^+(R_{4,5,6})_3 X^-$ wherein n=1 to 6 and $R_4$, $R_5$ and $R_6$ can be hydrogen, a $C_1$ to $C_6$ linear or branched group, or a $C_5$ to $C_8$ cycloalkyl, aromatic or alkylaromatic group; and $X^-$ is an anion such as chloride, bromide or methyl or hydrogen sulfate. Typical, but not limiting, ranges of composition of the terpolymer are represented preferably by x equal to 0.1 to 20 mole percent, more preferably 0.2 to 10 mole percent and most preferably 0.2 to 5 mole percent. The mole percentage of acrylamide, y, is preferably 0 to 94.9, more preferably 10 to 94.8 and most preferably 25 to 94.8. The mole percentage of the cationic monomer, z, is preferably 5 to 99.9, preferably 5 to 80, most preferably 5 to 70.

The process of the present invention can also provide polymers exemplified by the following formula:

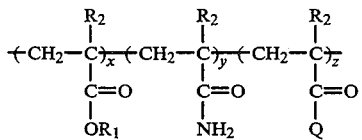

wherein $R_1$ is preferably a $C_4$ to $C_{30}$ linear or branched alkyl, alkylcycloalkyl or alkylaryl group, more preferably $C_6$ to $C_{22}$, and most preferably $C_6$ to $C_{18}$; $R_2$ is hydrogen or methyl; and Q is a salt of an ammonium cation, such as $NH(CH_2)_n N^+(R_{3,4,5})_3 X^-$ or $O(CH_2)_n N^+(R_{3,4,5})_3 X^-$ wherein n=1 to 6, and $R_3$, $R_4$ and $R_5$ can be hydrogen, a $C_1$ to $C_6$ linear or branched alkyl group, or a $C_5$ to $C_8$ cycloalkyl, aromatic or alkylaromatic group; and $X^-$ is an anion, such as chloride, bromide or methyl or hydrogen sulfate. Typical, but not limiting, ranges of composition of the terpolymer are represented preferably by x equal to 0.1 to 20 mole percent, more preferably 0.2 to 10 mole percent and most preferably 0.2 to 5 mole percent. The mole percentage of acrylamide, y, i s preferably 0 to 94.9, more preferably 10 to 94.8 and most preferably 25 to 94.8. The mole percentage of the cationic monomer, z, is preferably 5 to 99.9, more preferably 5 to 80, most preferably 5 to 70.

The process of the present invention can also provide polymers exemplified by the following formula:

wherein $R_1$ is preferably a $C_4$ to $C_{30}$ linear or branched alkyl, alkylcycloalkyl or alkylaryl group, more preferably $C_6$ to $C_{22}$, and most preferably $C_6$ to $C_{18}$; $R_2$ is the same or different group as $R_1$, or hydrogen or $C_1$ to $C_3$ linear or branched alkyl group; $R_3$ is hydrogen or methyl; $R_4$ and $R_5$ can be hydrogen, a $C_1$ to $C_6$ linear or branched alkyl group, or a $C_5$ to $C_8$ cycloalkyl, aromatic or alkylaromatic group; and $X^-$ is an anion such as chloride, bromide or methyl sulfate. Typical, but not limiting, ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 8 to 80, most preferably 5 to 70.

The process of the present invention can also provide polymers exemplified by the following formula:

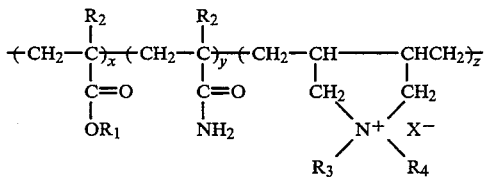

wherein $R_1$ is preferably a $C_4$ to $C_{30}$ linear or branched alkyl, alkylcycloalkyl or alkylaryl group, more preferably $C_6$ to $C_{22}$, and most preferably $C_6$ to $C_{18}$; $R_2$ is hydrogen or methyl; $R_3$ and $R_4$ can be hydrogen, a $C_1$ to $C_6$ linear or branched alkyl group, or a $C_5$ to $C_8$ cycloalkyl, aromatic or alkylaromatic group; and $X^-$ is an anion such as chloride, bromide or methyl sulfate. Typical, but not limiting, ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

Molecular weight of the polymer is also an important parameter which can be controlled by the polymerization process conditions of this invention. High molecular weight polymers incorporating both cationically charged ammonium groups and hydrophobic groups can be prepared by using high monomer concentrations under conditions which provide low effective radical concentration. For example, reducing the reaction temperature or the concentration of initiator will, in general, reduce the radical concentration and result in higher polymer molecular weights. In addition, the selection of the type of cosolvent, such as alcohol or acetone, and concentration of cosolvent will influence the polymer molecular weight. The reduction of molecular weight upon increasing alcohol cosolvent concentration can be compensated for by increasing monomer concentration and hydrophobe content. Increased molecular weight will improve solution theological properties and oily water treatment performance. All other things being equal, the higher the molecular weight the less soluble the polymer. Thus, as molecular weight is increased the amount of hydrophobic groups should be reduced and the amount of cationic groups increased. The presence of alcohol in the polymerization solvent also reduces solution viscosity, providing a more easily handled or diluted product.

To evaluate and characterize the unique and useful properties of hydrophobically associating polymers and the effect of the process conditions of this invention, dilute solution viscometric measurements were made. These measurements are particularly useful for evaluating the effect of composition and polymerization process conditions on the hydrodynamic size of the polymer in solution and the influence of associating groups. The hydrodynamic size is measured by the intrinsic viscosity which is proportional to the viscosity average polymer molecular weight. To determine intrinsic viscosity, the reduced viscosity is first evaluated at several polymer concentrations in the dilute regime. The reduced viscosity is defined as the incremental viscosity increase of the polymer solution relative to the pure solvent normalized with respect to the pure solvent viscosity and polymer concentration. A plot of reduced viscosity versus polymer concentration should yield a straight line at low polymer concentrations. The intercept of this reduced viscosity plot at zero polymer concentration is defined as the intrinsic viscosity, while the slope is the Huggin's interaction coefficient times the square of the intrinsic viscosity. The Huggin's constant is a measure of polymer-solvent interactions. For hydrophobically associating polymers it is characteristically greater than the 0.3 to 0.7 value normally observed for non-associating polymers, such as polyacrylamides.

Measurement of the dilute solution viscosity can be made with conventional Couette or capillary viscometers. A set of Ubbelohde capillary viscometers were used and shear rate effects were found to be negligible in the concentration range of interest. However, since the terpolymers contain cationic groups, a polyelectrolyte effect was observed in dilute solution. This polyelectrolyte effect resulted in an increase in reduced viscosity with decreasing polymer concentration and tended to mask the effect of hydrophobic associations. The addition of salts, such as sodium chloride or sodium sulfate, shielded the charge repulsion causing the polyelectrolyte effect and resulted in the desired linear reduced viscosity-concentration profile. The dilute solution measurements were, thus, made on solutions containing 2.0 weight percent sodium chloride.

The solution viscosity of associating polymers in the semi-dilute concentration regime is dramatically different than conventional water soluble polymers. Viscosities of these solutions were measured by means of a Contraves low shear viscometer, model LS 30, using a No. 1 cup and No. 1 bob. Temperatures were controlled to $\pm 0.1°$ C. and measurements were made at a variety of rotational speeds corresponding to shear rates from about 1.0 $\sec^{-1}$ to about 100 $\sec^{-1}$. In contrast to conventional water soluble polymers and relatively low molecular weight, weakly associating polymers, the polymers prepared by the process of this invention can exhibit significant relaxation times, which result in slow equilibration. To determine steady state viscosity values at a given stress or shear rate relatively long measurement times were employed. This effect is most evident at higher polymer concentrations, higher polymer molecular weights and in regions of strong intermolecular hydrophobic associations.

The primary advantage of the polymers disclosed here over polymers currently used is the discovery that the presence of a hydrophobic group on the water soluble polymer results in a significant improvement in the breaking of reverse emulsions and the removal of emulsified or dispersed oil from waste waters. By way of example, oil droplets emulsified in water generally carry a negative surface charge or zeta potential which helps to stabilize the emulsion, keeping the droplets dispersed and making them difficult to resolve or break. Cationic polymers or surfactants are used to neutralize the surface charge. Once the charge is neutral the droplets may begin to approach each other and agglomerate or coalesce since the electrostatic repulsion responsible for a significant portion of the emulsion's stability has been eliminated. Eventually large floc formation or liquid oil formation occurs. Once the droplets begin to flocculate they can begin to float since they are much larger than the starting oil droplets. As they grow in size they will rise to the surface of the water at a faster rate. If a high molecular weight cationic polymer is used for charge neutralization, the polymer will accelerate the separation of the oil since the polymer is attracted to the oil droplet by coulombic attraction, hydrogen bonding or other mechanisms. In some cases low molecular weight cationic chemicals are added for charge control and then high molecular weight nonionic or anionic polymers are added next to cause polymer bridging between droplets and accelerate floc formation.

The advantage of the disclosed polymers is related to the fact that they are water soluble or dispersible, but also contain small amounts of hydrophobic groups. Not wishing to be bound by theory, we believe that while conventional polymers can only attach themselves to oil droplets by coulombic attraction, hydrogen bonding or other mechanisms, the hydrophobic groups of these novel terpolymers can also be attached by a hydrophobic group-hydrophobic oil droplet association. While coulombic attraction still appears to be the strongest type of attraction, the hydrophobic association, or hydrophobic effect, appears to add a significant strengthening to this attraction, as evidenced by improved emulsion breaking and waste water clean-up. Indications are that the cationic hydrophobic polymers, prepared by the process of this invention, enable the formation of very strong floc particles. This is based on the observation that, unlike many conventional treatments, the floc particles produced by using the polymers prepared by the process of this invention are very difficult to redisperse. Adsorption of the hydrophobic functionalized water soluble polymer on the surface of the oil droplets is believed to be the cause of this observation. Further details on the use of hydrophobically associating cationic polymers for oily water clean-up treatment can be found in U.S. Pat. No. 4,741,835, which is herein incorporated by reference.

To evaluate the influence of polymerization process conditions on the use of these polymers for the removal of emulsified oil from water, about 0.1 to about 200 ppm of the hydrophobically functionalized water soluble cationic polymer were added. After contacting under suitable agitation conditions for a prescribed time period, the emulsified oil droplets and polymer separated under quiescent conditions into a distinct layer from the water. The rate of mixing after polymer addition varied, depending on the type of water being treated, the amount of oil emulsified in the water, temperature and several other conditions. The concentration of oil remaining in the water after treatment with the disclosed polymers was significantly less than the concentration of oil remaining in the water after similar treatment with a similar polymer not containing the novel hydrophobe functionalization. The oil which separated as a distinct layer from the layer of water was separated from the water by conventional methods.

While it is difficult to exactly simulate a process to break oily water emulsions and oil field-produced fluids, commonly referred to as reverse emulsions, it is common practice to make laboratory emulsions using crude oil from an oil production field of interest by high shear-mixing the given crude into water using a Waring blender or homogenizer. The formed oil-in-water emulsion can then be diluted with water and other suitable materials to simulate the oil production field being studied. The emulsions thus produced simulate oily waste waters from a given area, but are recognized as being an approximation. One would typically use these laboratory emulsions for testing chemical additives in the laboratory prior to confirmatory testing on the actual system in the field.

A common laboratory test used to simulate a mild water clarification process in the field is what is referred to as the Jar Test. The Jar Test involves putting 500 ml of a laboratory prepared or actual field emulsion into 600 ml clear glass beakers (six at a time). Larger beakers may be used if enough fluid is available. The beakers are then placed on a six paddle Phipps & Bird stirrer and mixed at a high rate, referred to as the fast mix period. Polymer is added at this mixing speed and timing is begun. After a specified amount of time at high speed, the mixing rate is reduced to a much slower rate for another specified amount of time. The beakers are removed from the mixer and allowed to stand for another period of time. Samples of solution are removed from a point near the 250 ml mark on the beakers and tested for turbidity (NTU) using standard test equipment and oil-in-water content using one of several available methods. An example of one of the oil-in-water determinations is to Freon-extract the oil from a waste water and then measure its infrared absorbance relative to a standard. The object of the test is to achieve the lowest NTU or oil level using the smallest amount of polymer. The actual mixing rates and times used in the Jar Test depend on the system being simulated and vary from study to study. The Jar Test, from the experience of many investigators over the years, has been shown to provide a good simulation of field clarification systems.

Another laboratory test commonly used in the current art is the Wemco 1+1 Laboratory Flotation Machine, available from Wemco in Sacramento, Calif. The technique used by the Wemco is also commonly referred to as induced air flotation. The Wemco 1+1 Laboratory Flotation Machine is a small scale pilot unit designed to model the full scale units, built by Wemco, which are commonly used in oil fields and in several other industries for water clarification and oil and solids removal. The laboratory Wemco, from the experience of several investigators over the years, has been found to provide a good simulation of what will occur in the larger unit when it is used in the evaluation of chemical additives. Laboratory prepared or actual field waste waters or emulsions are added to the test bowl of the Wemco and mixed for a few seconds with chemical additives without aeration. The air is then turned on and flotation occurs. Samples of the Wemco treated water are then withdrawn from a point near the bottom of the bowl for turbidity and oil-in-water determinations as described above.

DESCRIPTION OF THE PREFERRED EMBODIMENTS

The following Examples illustrate the present invention without, however, limiting the same hereto.

EXAMPLES 1-5

Polymerization of N-1-Octylacrylamide, MAPTAC and Acrylamide

An aqueous methanol solution was prepared with purified, deoxygenated water. N-octylacrylamide, $C_8AM$, was dissolved in this solution, followed by acrylamide and 3-methacrylamidopropyltrimethylammonium chloride, MAPTAC. The resulting solution was carefully transferred to a 1L Morton style resin kettle fitted with a chilled water condenser, thermometer, inert gas sparger and mechanical stirrer. The temperature was adjusted to 25° C. and polymerization was initiated by the addition of $K_2S_2O_8$, followed by $Na_2S_2O_5$. After stirring for 16 hours at 25° C. the viscous solution was poured slowly into 3L of acetone. The precipitated polymer was then masticated in a Waring blender with additional acetone, filtered and dried under vacuum at 30° C. A number of polymers were prepared using similar techniques with different amounts of hydrophobic N-1-octylacrylamide monomer, cationic MAPTAC monomer and methanol, as listed in Table I. The elemental analysis of these polymers is given in Table II.

TABLE I

Compositional Data for Acrylamide-MAPTAC Polymers

| Ex. No. | MAPTAC, Mole % | $C_8AM$ Mole % | Methanol Vol. % | Conc., Wt. % | $K_2S_2O_8$ [M × $10^4$] | $Na_2S_2O_5$ [M × $10^4$] |
|---|---|---|---|---|---|---|
| 1 | 20 | 0 | 25 | 4.5 | 8.3 | 8.3 |
| 2 | 20 | 1.0 | 25 | 4.5 | 8.1 | 8.1 |
| 3 | 20 | 1.0 | 25 | 4.5 | 8.1 | 8.1 |
| 4 | 20 | 1.5 | 50 | 4.5 | 8.0 | 8.0 |
| 5 | 5 | 1.0 | 25 | 4.5 | 13 | 13 |

TABLE II

Elemental Analysis of Terpolymers

| Example No. | Cl Analysis, % Calculated | Cl Analysis, % Found | MAPTAC Incorporation[a] % | Conversion % |
|---|---|---|---|---|
| 1 | 6.96 | 7.02 | 101 | 52.9 |
| 2 | 6.96 | 6.63 | 95.3 | 27.4 |
| 3 | 6.92 | 6.82 | 98.6 | 47.2 |
| 4 | 7.03 | 6.18 | 87.9 | 24.0 |
| 5 | 2.23 | 1.80 | 80.7 | 36.0 |

[a]MAPTAC incorporation = Cl (found) × Cl (calculated) × 100 corrected for polymer volatiles content.

EXAMPLES 6–19

Polymerization of N-t-Octylacrylamide, MAPTAC and Acrylamide

A 1L resin kettle was fitted with a water condenser, heating mantle, thermometer, temperature controller, inert gas sparget, injection port and mechanical stirrer. All reagents were added and diluted to specified concentration with deionized water according to the requirements in Table III. The reactor contents were brought to reaction temperature while sparging with nitrogen. Polymerization was initiated with $K_2S_2O_8$. A second injection of initiator was added after 1 hour. The polymerizations were complete in 3 to hours. The product polymer was either used as is or precipitated into acetone and dried under vacuum. Table III contains specific examples of feed ingredients and reaction parameters. A number of terpolymers were made using similar techniques with different amounts of N-t-octylacrylamide monomer ($tC_8AM$), MAPTAC and acrylamide. In addition, temperature, total monomer concentration, isopropanol (IPA) and initiator levels were varied, resulting in product viscosity changes cited in Table III. The polymer of Example 18 was prepared without organic solvent, resulting in a product mixture that was a gel; its viscosity was beyond the measurement capabilities of the instrument (>150,000). Example 19 is representative of polymers made by a micellar polymerization process wherein the water insoluble, hydrophobic monomer is dispersed into the aqueous polymerization medium with a surfactant. In this example a nonionic surfactant, CO-710, was used. A detailed description of this process is presented in U.S. Pat. No. 4,471,835.

Turbidity: 270 to 280 NTU
Oil Content: 420 to 450 mg/l
pH: 8.0 (adjusted)

Usually a large volume of this emulsion (15 liters) was prepared and any unused portion was discarded at the end of the day. The emulsion concentrate was occasionally prepared several days ahead of time and removed from the separatory funnel after the prescribed aging time.

EXAMPLE 21

Polymer Performance Measured by Wemco Oily Water Test

An induced air flotation test was used in the laboratory to simulate field induced air flotation units. A Wemco 1+1Laboratory Flotation Machine, available from Wemco in Sacramento, Calif., was used. Three liters of emulsion prepared in Example 20 were placed in the Wemco vessel. The mixer was turned on and maintained at 1,000 rpm and test polymer added and mixed in for 30 seconds. The air was then turned full on while mixing continued for 120 seconds. By this time froth is formed and oil floats to the surface when an effective polymer or additive is present. The unit was turned off after the 120 second aeration and permitted to sit without movement for 30 seconds. Samples for turbidity were withdrawn by pipet from a fixed point in the bottom of the vessel after the 30 second wait. The polymers tested along with their performance are presented in Table IV.

It is clear from these data that the polymers prepared by the solution process of this invention can exhibit oily water clean-up that is comparable to that of the polymer

TABLE III

Polymerization Data for N-t-Octylacrylamide, MAPTAC and Acrylamide Polymers

| Example No. | MAPTAC Mole % | tC₈AM Mole % | IPA Wt. % | Temp. °C. | Monomer Concentration Wt. % | $K_2S_2O_8$ Wt. % | Product Viscosity cps |
|---|---|---|---|---|---|---|---|
| 6 | 10 | 2 | 6 | 70 | 21 | 0.018 | 8,600 |
| 7 | 10 | 2 | 6 | 70 | 21 | 0.018 | 11,500 |
| 8 | 20 | 2 | 6 | 70 | 21 | 0.018 | 5,200 |
| 9 | 10 | 4 | 6 | 70 | 21 | 0.018 | 9,500 |
| 10 | 10 | 6 | 6 | 70 | 21 | 0.018 | 11,300 |
| 11 | 10 | 2 | 3 | 70 | 21 | 0.018 | 110,000 |
| 12 | 10 | 2 | 10 | 70 | 21 | 0.018 | 3,400 |
| 13 | 10 | 2 | 6 | 60 | 21 | 0.018 | 16,200 |
| 14 | 10 | 2 | 6 | 80 | 21 | 0.018 | 4,600 |
| 15 | 10 | 2 | 6 | 70 | 27 | 0.018 | 94,000 |
| 16 | 10 | 2 | 6 | 70 | 24 | 0.018 | 66,800 |
| 17 | 10 | 2 | 6 | 70 | 21 | 0.009 | 17,600 |
| 18 | 10 | 2 | 0 | 70 | 21 | 0.018 | gel |
| 19 | 10 | 2 | * | 50 | 10 |  | 50,000 |

*Ethoxylated nonyl phenol (10 ethoxy groups), CO-710, supplied by GAF Corp., was used at 3 weight percent concentration.

EXAMPLE 20

Synthetic Emulsion Preparation

Cody crude oil (10 grams), with the free water removed, was emulsified into 495 grams of distilled water containing 100 ppm of an anionic surfactant using a Waring blender or a homogenizer. The concentrated emulsion was permitted to sit overnight (approximately 18 hours) in a separatory funnel and then the bottom layer was diluted (25 grams of emulsion per liter of distilled water) and the salinity was adjusted to 600 ppm NaCl. This resulted in a test emulsion with the following typical properties.

produced by the micellar process. However, it should be noted that the product of the micellar process will be of higher molecular weight than that provided by the solution process. In some applications, especially if polymer molecular weight is not a critical parameter, advantage can be gained from the lower molecular weight solution process. For example, since the product viscosity provided by the solution process is significantly lower than that of the micellar process, even at much higher resultant polymer concentrations (21 versus 10 weight percent), the advantages of the process of this invention are the economics of smaller scale and ease of handling the less viscous product.

TABLE IV

| Ex. No. | MAPTAC Mole % | tC₈AM Mole % | Wemco Test Data ||| Product Visc. cps | Turbidity Remaining, % NTU @ 1 ppm |
| --- | --- | --- | --- | --- | --- | --- | --- |
| | | | IPA Wt. % | Monomer Conc. Wt. % | | | |
| 6 | 10 | 2 | 6 | 21 | 8,600 | 3 |
| 7 | 10 | 2 | 6 | 21 | 11,500 | 3 |
| 8 | 20 | 2 | 6 | 21 | 5,200 | 4 |
| 9 | 10 | 4 | 6 | 21 | 9,500 | 4 |
| 19 | 10 | 2 | * | 10 | 50,000 | 4 |

*Ethoxylated nonyl phenol (10 ethoxy groups), CO-710, supplied by GAF Corp., was used at 3 weight percent concentration.

What is claimed is:

1. A free radical polymerization process for the formation of a polymer of acrylamide, a hydrophobic monomer and a cationic monomer wherein said polymer is selected from the group consisting of:

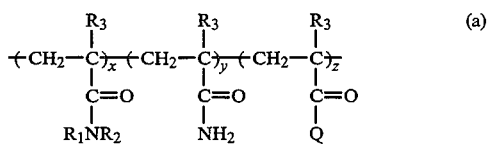
(a)

wherein $R_1$ is a $C_4$ to $C_{30}$ linear or branched alkyl, alkylcycloalkyl or alkylaryl group; $R_2$ is a same or different group as $R_1$, or hydrogen or $C_1$ to $C_3$ linear or branched alkyl group; $R_3$ is hydrogen or methyl; Q is a salt of an ammonium cation, such as $NH(CH_2)_n N^+(R_{4,5,6})_3 X^-$ or $O(CH_2)_n N^+(R_{4,5,6})_3 X^-$ wherein n=1 to 6 and $R_4$, $R_5$ and $R_6$ can be hydrogen, a $C_1$ to $C_6$ linear or branched alkyl group, or $C_5$ to $C_8$ cycloalkyl, aromatic, or alkylaromatic group; $X^-$ is an anion, such as chloride, bromide or methyl or hydrogen sulfate; and wherein x equals 0.1 to 20 mole percent; y is 1 to 94.9; and z is 5 to 99.9;

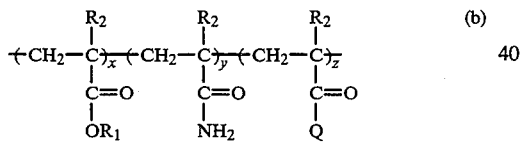
(b)

wherein $R_1$ is a $C_4$ to $C_{30}$ linear or branched alkyl, alkylcycloalkyl or alkylaryl group; $R_2$ is hydrogen or methyl; Q is a salt of an ammonium cation, such as $NH(CH_2)_n N^+(R_{3,4,5})_3 X^-$ or $O(CH_2)_n N^+(R_{3,4,5})_3 X^-$ wherein n=1 to 6 and $R_3$, $R_4$ and $R_5$ can be hydrogen, a $C_1$ to $C_6$ linear or branched alkyl group, or $C_5$ to $C_8$ cycloalkyl, aromatic, or alkylaromatic group; $X^-$ is an anion, such as chloride, bromide or methyl or hydrogen sulfate; and wherein x equals 0.1 to 20 mole percent; y is 1 to 94.9; and z is 5 to 99.9;

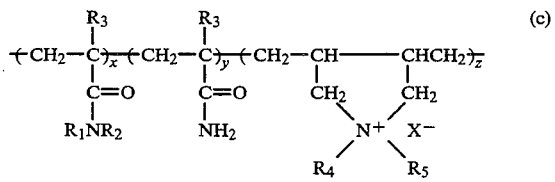
(c)

wherein $R_1$ is a $C_4$ to $C_{30}$ linear or branched alkyl, alkylcycloalkyl or alkylaryl group; $R_2$ is the same or different group as $R_1$, or hydrogen or $C_1$ to $C_3$ linear or branched alkyl group; $R_3$ is hydrogen or methyl; $R_4$ and $R_5$ can be hydrogen, a $C_1$ to $C_6$ linear or branched alkyl group, or a $C_5$ to $C_8$ cycloalkyl, aromatic or alkylaromatic group; $X^-$ is an anion, such as chloride, bromide or methyl sulfate; and wherein x equals 0.1 to 20 mole percent; y is 1 to 94.9; and z is 5 to 99.9;

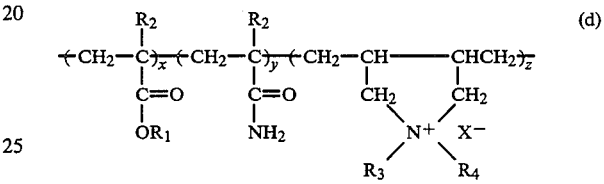
(d)

wherein $R_1$ is a $C_4$ to $C_{30}$ linear or branched alkyl, alkylcycloalkyl or alkylaryl group; $R_2$ is hydrogen or methyl; $R_3$ and $R_4$ can be hydrogen, a $C_1$ to $C_6$ linear or branched alkyl group, or a $C_5$ to $C_8$ cycloalkyl, aromatic or alkylaromatic group; and $X^-$ is an anion, such as chloride, bromide or methyl sulfate; and wherein x equals 0.1 to 20 mole percent; y is 1 to 94.9; and z is 5 to 99.9, which consists essentially of:

a. forming a solution in deoxygenated water of a nonionic acrylamide monomer, hydrophobic monomer and a cationic monomer and including a minor amount by volume of oxygenated solvent containing 1 to 4 carbon atoms;
 b. adding free radical initiator to said solution to form a reaction mixture;
 c. copolymerizing said reaction mixture at a temperature of about 10° C. to 90° C. for a sufficient period of time to form said terpolymer substantially completely dissolved within said water and oxygenated solvent.

2. A process according to claim 1 wherein said polymer is water soluble or dispersible.

3. A process according to claim 1 or 2 wherein the total monomer concentration in the polymerization medium is 2 to 50 weight percent.

4. A process according to claim 1 or 2 wherein said miscible solvent is a $C_1$ to $C_4$ linear or branched oxygenated solvent, such as acetone, methanol, ethanol, propanol, isopropanol and the isomers of butanol.

5. A process according to claim 1 or 2 wherein said free radical initiator is selected from the water soluble group consisting of hydrogen peroxide sodium, potassium or ammonium persulfate and 2,2'-azobis(2-amidinopropane).2HCl.

6. A process according to claim 1 or 2 wherein said free radical initiator is a water soluble redox couple comprising:
 a. an oxidant, including sodium, potassium or ammonium persulfate or bromate; and
 b. a reductant, including sodium metabisulfite or a tertiary amine, such as triethylamine.

7. A process according to claim 1 or 2 wherein said polymer has the formula:

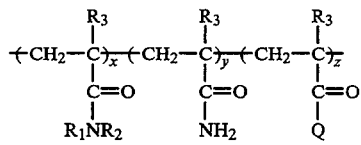

wherein $R_1$ is a $C_4$ to $C_{30}$ linear or branched alkyl, alkylcycloalkyl or alkylaryl group; $R_2$ is the same or different group as $R_1$, or hydrogen or $C_1$ to $C_3$ linear or branched alkyl group; $R_3$ is hydrogen or methyl; Q is a salt of an ammonium cation, such as $NH(CH_2)_nN^+(R_{4,5,6})_3X^-$ or $O(CH_2)_nN^+(R_{4,5,6})_3X^-$ wherein $n=1$ to 6, and $R_4$, $R_5$ and $R_6$ can be hydrogen, a $C_1$ to $C_6$ linear or branched alkyl group, or a $C_5$ to $C_8$ cycloalkyl, aromatic, or alkylaromatic group; $X^-$ is an anion, such as chloride, bromide or methyl or hydrogen sulfate; and wherein x equals 0.2 to 10 mole percent; y is 0 to 94.8; and z is 5 to 80.

8. A process according to claim 1 or 2 wherein said polymer has the formula:

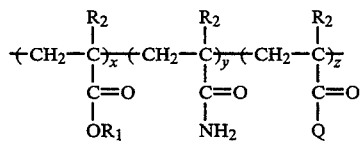

wherein $R_1$ is a $C_4$ to $C_{30}$ linear or branched alkyl, alkylcycloalkyl or alkylaryl group; $R_2$ is hydrogen or methyl; Q is a salt of an ammonium cation, such as $NH(CH_2)_nN^+(R_{3,4,5})_3X^-$ or $O(CH_2)_nN^+(R_{3,4,5})_3X^-$ wherein $n=1$ to 6, and $R_3$, $R_4$ and $R_5$ can be hydrogen, a $C_1$ to $C_6$ linear or branched alkyl group, or a $C_5$ to $C_8$ cycloalkyl, aromatic or alkylaromatic group; $X^-$ is an anion such as chloride, bromide or methyl or hydrogen sulfate; and wherein x equals 0.2 to 10 mole percent; y is 10 to 94.8; and z is 5 to 70.

9. A process according to claim 1 or 2 wherein said polymer has the formula:

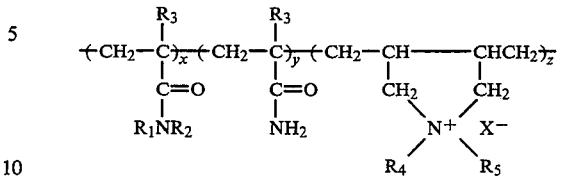

wherein $R_1$ is a $C_4$ to $C_{30}$ linear or branched alkyl, alkylcycloalkyl or alkylaryl group; $R_2$ is the same or different group as $R_1$, or hydrogen or $C_1$ to $C_3$ linear or branched alkyl group; $R_3$ is hydrogen or methyl; $R_4$ and $R_5$ can be hydrogen, a $C_1$ to $C_6$ linear or branched alkyl group, or a $C_5$ to $C_8$ cycloalkyl, aromatic or alkylaromatic group; $X^-$ is an anion, such as chloride, bromide or methyl sulfate; and wherein x equals 0.2 to 10 mole percent; y is 10 to 94.8; and z is 5 to 70.

10. A process according to claim 1 or 2 wherein said polymer has the formula:

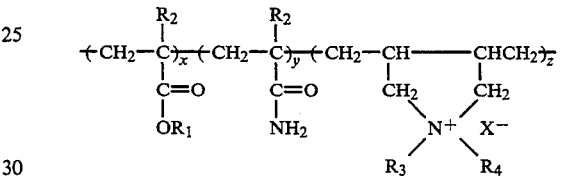

wherein $R_1$ is a $C_4$ to $C_{30}$ linear or branched alkyl, alkylcycloalkyl or alkylaryl group; $R_2$ is hydrogen or methyl; $R_3$ and $R_4$ can be hydrogen, a $C_1$ to $C_6$ linear or branched alkyl group; or a $C_5$ to $C_8$ cycloalkyl, aromatic or alkylaromatic group; and $X^-$ is an anion, such as chloride, bromide or methyl sulfate; and wherein x equals 0.1 to 20 mole percent; y is 1 to 94.90; and z is 5 to 99.9.

11. The polymer solution resulting from the process of claim 1.

* * * * *